(12) United States Patent
Kanaoka

(10) Patent No.: US 6,610,245 B2
(45) Date of Patent: Aug. 26, 2003

(54) FRICTION MEMBER MANUFACTURING METHOD

(75) Inventor: Jyunji Kanaoka, Hirakata (JP)

(73) Assignee: Exedy Corporation, Osaka (JP)

(*) Notice: Subject to any disclaimer, the term of this patent is extended or adjusted under 35 U.S.C. 154(b) by 5 days.

(21) Appl. No.: 09/796,426

(22) Filed: Mar. 2, 2001

(65) Prior Publication Data

US 2001/0021352 A1 Sep. 13, 2001

(30) Foreign Application Priority Data

Mar. 13, 2000 (JP) ........................................ 2000-069120

(51) Int. Cl.$^7$ .............................. C22C 32/00; B22F 1/00
(52) U.S. Cl. ............................................. 419/11; 419/39
(58) Field of Search ............................... 419/11, 12, 13, 419/14, 39; 264/642

(56) References Cited

U.S. PATENT DOCUMENTS 4,871,394 A * 10/1989 Baker et al. ................... 75/232
5,854,966 A * 12/1998 Kampe et al. ................ 419/67

* cited by examiner

*Primary Examiner*—Christopher A. Fiorilla
(74) *Attorney, Agent, or Firm*—Shinjyu Global IP Counselors, LLP

(57) ABSTRACT

A method of manufacturing a friction member by mixing powders of copper/tin-contained metal, ceramic and graphite, and performing high pressure molding and sintering. This manufacturing method produces a high-performance friction member of copper/tin-contained metal, in which segregation of tin is suppressed. Basically, the friction member manufacturing method includes the steps of: mixing powders of copper/tin-contained metal, ceramic, and graphite with each other to form a powder; molding the mixed powders under a pressure larger than 3 MPa; and sintering a molded object.

11 Claims, 4 Drawing Sheets

FRICTION MEMBER MANUFACTURING METHOD

BACKGROUND OF THE INVENTION

1. Field of the Invention

This invention generally relates to a method of manufacturing a friction member. More specifically, the present invention relates to a method of manufacturing a friction member by mixing powders of copper/tin-contained metal, ceramics and graphite, and performing high-pressure molding and sintering.

2. Background Information

A clutch device of an automobile is fixedly coupled to a flywheel of an engine. The clutch device is primarily formed of a clutch disk assembly and a clutch cover assembly. The clutch disk assembly is formed of a hub coupled to a shaft extending from a transmission, a plate member coupled to the hub for torque transmission, and a frictional coupling member (clutch disk) fixedly coupled to an outer peripheral portion of the plate member. The frictional coupling member is formed of, e.g., an annular plate and friction facings (friction members) fixedly coupled to the opposite surfaces of the plate, respectively. The material of the friction facing can be basically selected from an organic material and a metallic material.

The metallic material is used for heavy vehicles and racing vehicles owing to high resistances of the metal to heat and pressure. The friction facing made of the metallic material is produced by heating and sintering a mixture of predetermined materials to form and fix the facing onto a core plate. The metallic material is primarily formed of a copper powder, and also contains additives such as tin, graphite and ceramics mixed therein. The tin is added for increasing the sintering strength. Graphite is added as a lubricant component for achieving smooth operation properties. Ceramics such as alumina and silica are required as a friction control agent for maintaining and improving a friction resistance and improving a wear resistance.

The conventional metallic friction member described above is molded at a pressure from about 2 MPa to 3 MPa. When such a conventional metallic member is kept at a high temperature of about 300° C. or more for a long time, a large amount of tin segregates so that the structure of the friction member is liable to become irregular. A portion containing segregated tin starts melting prior to the other portion. This promotes wear, and therefore tends to lower the friction coefficient.

In view of the above, there exists a need for method of manufacturing a friction member which overcomes the above mentioned problems in the prior art. This invention addresses this need in the prior art as well as other needs, which will become apparent to those skilled in the art from this disclosure.

SUMMARY OF THE INVENTION

An object of the invention is to manufacture a copper/tin-contained metal friction member having high performance characteristics in which segregation of the tin is suppressed.

According to a first aspect of the present invention, a friction member manufacturing method includes the steps of: mixing powders of copper/tin-contained metal, ceramics, and graphite with each other to form a powder mixture; molding the powder mixture under a pressure larger than 3 MPa to form a molded object; and sintering the molded object. In the method of this aspect of the present invention, since the powder mixture is molded under a pressure higher than 3 MPa, segregation of the tin is suppressed in the friction member even when the friction member is kept at a high temperature for a long time.

According to a second aspect of the present invention, the friction member manufacturing method according to the first aspect further has such features that the pressure for molding is in a range from 3 MPa to about 4 MPa. In the method of this aspect of the present invention, since the pressure for molding is equal to or lower than 4 MPa, drop or the like of the material from the friction member is suppressed.

According to a third aspect of the present invention, the friction member manufacturing method according to the second aspect further has such features that the pressure for molding is in a range from about 3.2 MPa to about 3.4 MPa. In the method of this aspect of the present invention, segregation of the tin is suppressed, and drop or the like of the material from the friction member is suppressed.

According to a fourth aspect of the present invention, the friction member manufacturing method according to any one of the first to third aspects of the present invention further has such features that the graphite is about 50 μm to about 200 μm in particle diameter and 1 to 20% in weight ratio, and said ceramics is about 50 μm to about 200 μm in particle diameter and 1 to 15% in weight ratio.

According to a fifth aspect of the present invention, the friction member manufacturing method according to any one of the first to fourth aspects of the present invention further has such features that the ceramics is made of at least one of a combination of silica, mullite and zircon sand.

These and other objects, features, aspects and advantages of the present invention will become apparent to those skilled in the art from the following detailed description, which, taken in conjunction with the annexed drawings, disclose preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
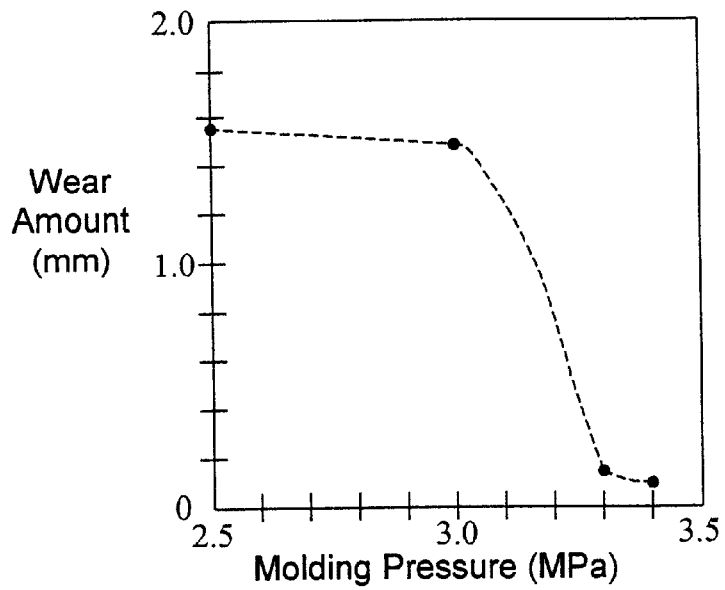
FIG. 1 is a graph showing the relationship between molding pressure of friction members verses the amount of wear in the friction members.

A friction member according to the present invention is a metallic friction member having a metal matrix formed of a copper-tin alloy (i.e., an alloy containing copper and tin). Preferably, the friction member is configured to be used as a friction facing of a clutch disk. Thus, the friction member is typically a ring shaped member with a mounting face and a friction facing. The friction facing can have grooves if needed and/or desired.

A binder used in forming the metal matrix is primarily made of copper, and further contains tin for improving a sintering strength. A copper powder and a tin powder can be mixed together just prior to use of the powder mixture, or a powder mixture of copper-tin alloy can be prepared in advance of the molding procedure.

The graphite is used as a lubricating component for providing smooth operation characteristics. The graphite is about 50 μm to about 200 μm in particle diameter and 1 to 20% in weight ratio.

A friction control agent is used for maintaining and improving the friction resistance and for improving the wear resistance. The friction control agent is a ceramic, which is preferably at least one or more of the following materials: silica, mullite and zircon sand. This ceramic is about 50 μm to about 200 μm in particle diameter and is 1 to 15% in weight ratio.

In the manufacturing process, a mixture of the powders of copper and tin or the powder mixture of the copper-tin alloy is first mixed with the graphite powder and the ceramic powder. This powder mixture is then subjected to a high-pressure molding at room temperature. The powder molding pressure in this processing is most preferably at least equal to about 3.3 MPa. Finally, high-temperature sintering is performed in an atmosphere that suppresses oxidation and/or removes oxygen of the friction material. This sintering is performed at a temperature of about 780° C. to about 900° C. for about 30 minutes to about 90 minutes.

In the friction member thus formed, a high-density structure can be easily achieved if the material powder is made of the mixture of copper and tin powders. Since the molding pressure is sufficiently high, segregation of tin is suppressed, and the sintered structure can have sufficient uniformity. More specifically, the amount of the segregated tin can be small even after the friction member is kept at a high temperature of about 300° C. or more for a long time such as in use as a friction member of a clutch disk. Accordingly, the wear as well as lowering of the friction coefficient can be suppressed. The rate of segregation of tin is preferably about 8% or less, and more preferably 4% or less. If the powder molding pressure is about 3.3 MPa or more, the rate of tin segregation is substantially equal to 0%.

Since the powder molding pressure is sufficiently large, the density of sintered alloy can be high, and the wear resistance is improved. Moreover, since the powder molding pressure is not extremely high fragility or the like, the material of the friction member can be suppressed.

EXAMPLES OF IMPLEMENTATION

Evaluations were conducted on various friction members manufactured under conditions, which were different only in powder molding pressure from each other, to determine their performances as a friction material. More specifically, these friction members were molded under pressures of 2.5 MPa, 3.0 MPa, 3.3 MPa and 3.4 MPa, respectively.

First, wear resistances of the respective friction members were determined. More specifically, a comparison was made between wear amounts of the respective friction members using the following test. A machine used for this test was a dampening vibrator machine of an inertia absorbing type (full-size tester). The test was performed under the following conditions: a rotation speed of 950 rpm, an inertia of 15.70 kgm•s², a clutch size outer diameter of 350 mm, a set load of 13666 N and a cycle of 5000. As can be seen from FIG. 1, the wear amount rapidly lowers from about 1.5 mm when the powder molding pressure exceeds 3.0 MPa. The wear amount takes an extremely small value of 0.2 mm or less when the molding pressure is equal or close to 3.3 MPa.

Figure 2:
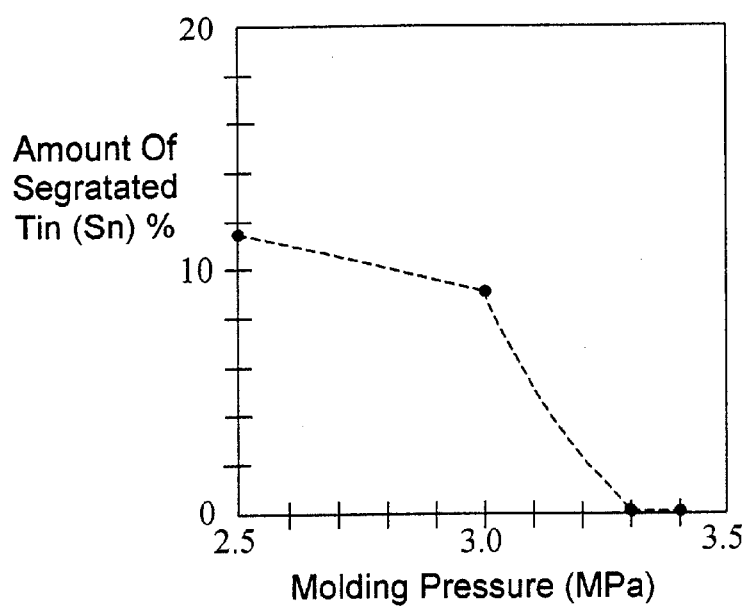
FIG. 2 is a graph showing the relationship between molding pressure of friction members verses the amount of segregated tin in the friction members.
Figure 7:
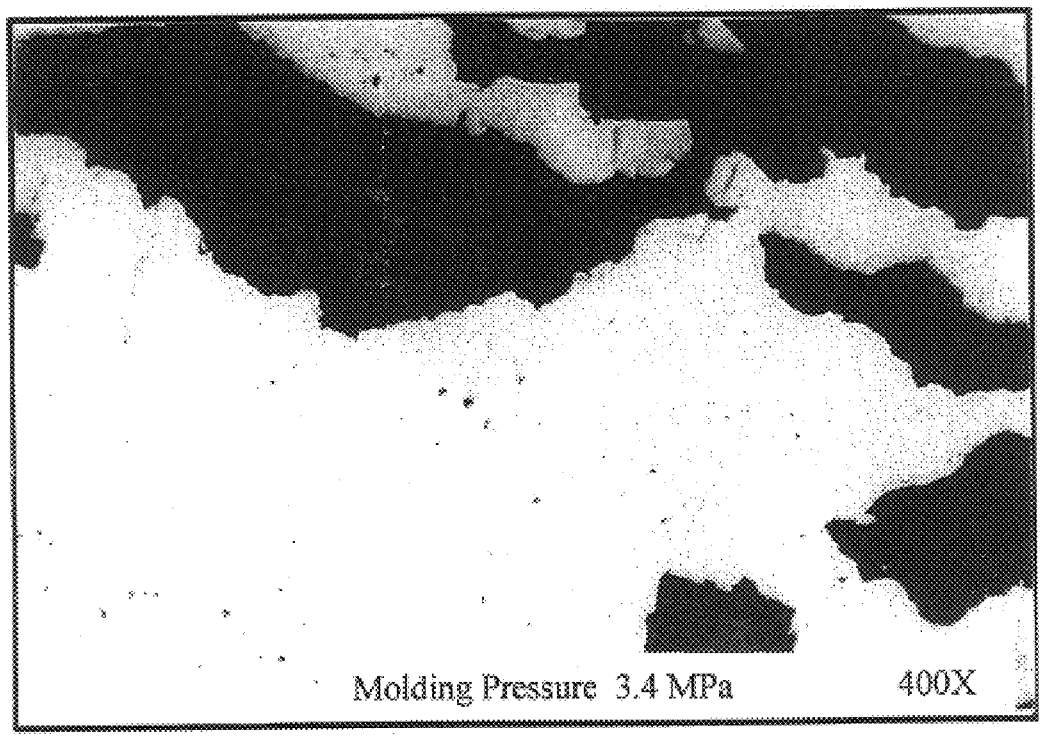
FIG. 7 is a magnified view of a friction member showing microscopic structures of the friction member that was molded under a pressure of 3.4 MPa.

The amount of tin that segregated at a high temperature was determined. More specifically, comparison was made between the amounts of tin, which segregated in the respective friction members when these members were disposed in a furnace at a high temperature of 300° C. or more, e.g., for 3 hours and 30 minutes. As can be seen from FIG. 2, the amount of segregated tin rapidly lowered when the molding pressure exceeded 3.0 MPa, and became substantially equal to 0% when the pressure was equal or close to 3.3 MPa. FIGS. 4–7 show the microscopic structures of the respective friction members at magnifications of 400 times. As can be seen from FIG. 4, a large amount of segregated tin (about 11.4%) was present in the friction member molded under the pressure of 2.5 MPa. In the friction member molded under the pressure of 3.0 MPa, as can be seen from FIG. 5, the amount of segregated tin is lower than the above, but is still large (about 9.5%). As can be seen from FIG. 6, there was substantially no segregation of tin in the friction member molded under the pressure of 3.3 MPa. As shown in FIG. 7, when the molding pressure was 3.4 MPa, there was substantially no segregation of tin similarly to the case of 3.4 MPa, but ceramic became conspicuous.

Figure 3:
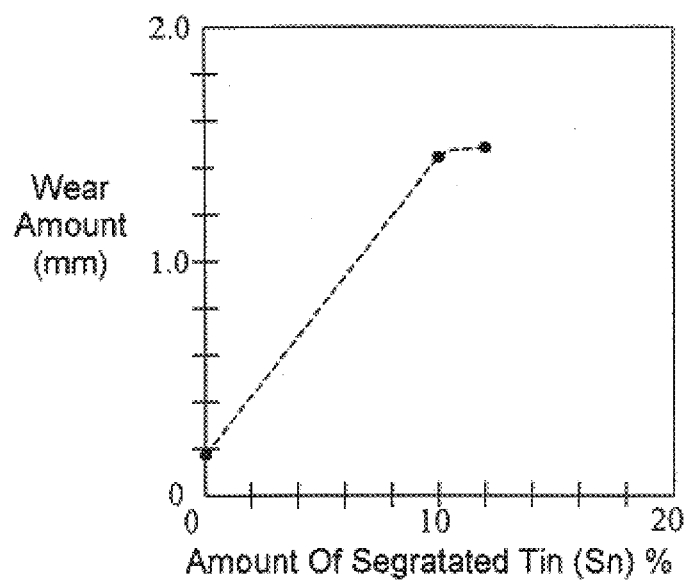
FIG. 3 is a graph showing the relationship between the amount of segregated tin in the friction members verses the amount of wear in the friction members.
Figure 4:
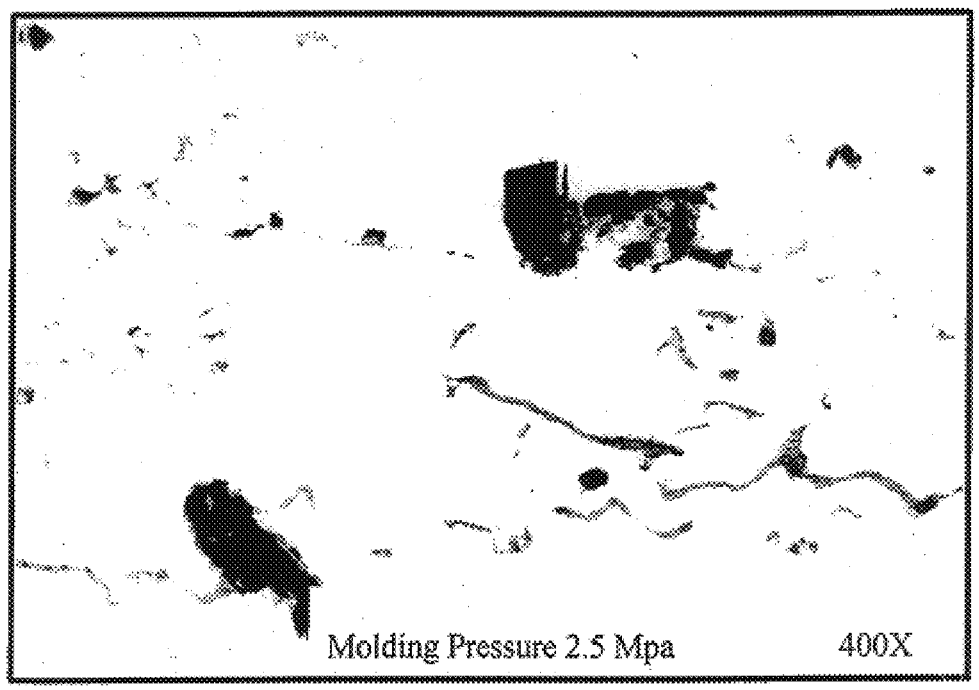
FIG. 4 is a magnified view of a friction member showing microscopic structures of the friction member that was molded under a pressure of 2.5 MPa.
Figure 5:
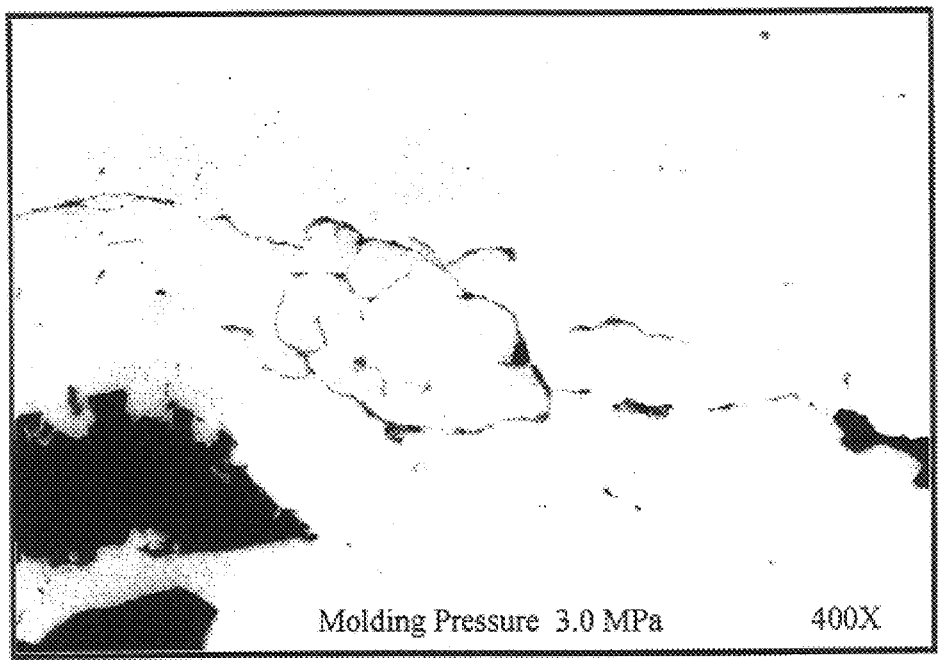
FIG. 5 is a magnified view of a friction member showing microscopic structures of the friction member that was molded under a pressure of 3.0 MPa.
Figure 6:
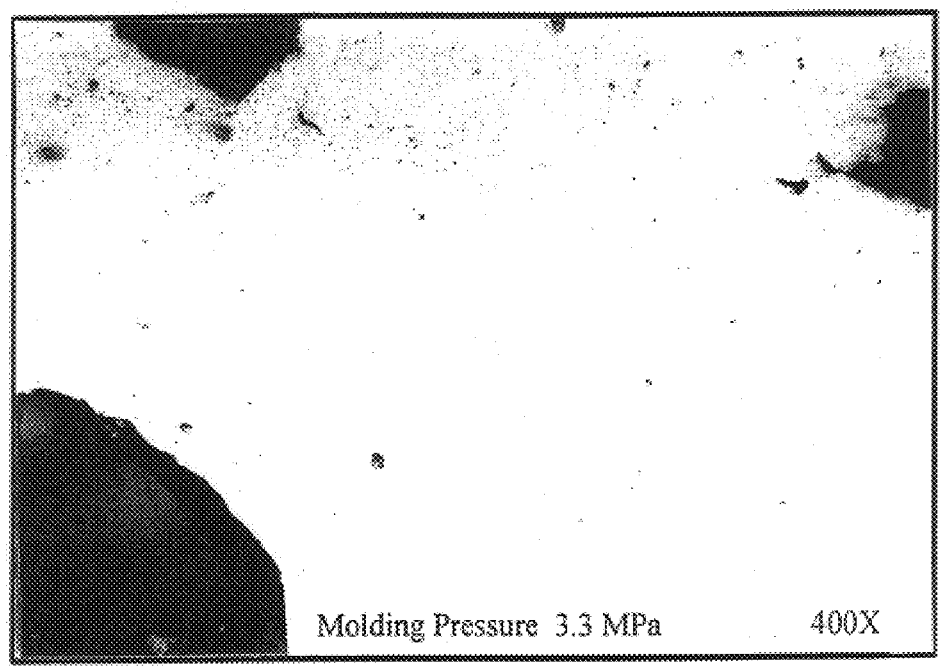
FIG. 6 is a magnified view of a friction member showing microscopic structures of that friction member that was molded under a pressure of 3.3 MPa.

FIG. 3 shows a relationship between the amount of segregated tin and the amount of wear. As can be seen from FIG. 3, these amounts are substantially proportional to each other, and the amount of wear substantially depends on the segregation of tin.

In the method of manufacturing the friction member according to the present invention, since the mixed powders are molded under the pressure exceeding 3 MPa, segregation of tin can be suppressed in the friction member even when it is kept at a high temperature for a long time.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A friction member manufacturing method comprising steps of:
    mixing powders of copper/tin-contained metal, ceramic, and graphite with each other to form a powder mixture;
    molding said powder mixture under a pressure greater than or equal to 3 MPa and less than 4 MPa to form a molded object, said pressure being selected to suppress segregation of tin to 8% or less; and
    sintering said molded object.

2. The friction member manufacturing method according to claim 1, wherein
said pressure for said molding is in a range from about 3.2 MPa to about 3.4 MPa.

3. The friction member manufacturing method according to claim 2, wherein
said graphite is about 50 μm to about 200 μm in particle diameter and 1 to 20% in weight ratio, and
said ceramic is about 50 μm to about 200 μm in particle diameter and 1 to 15% in weight ratio.

4. The friction member manufacturing method according to claim 3, wherein
said ceramic is made of a combination of at least one of silica, mullite and zircon sand.

5. The friction member manufacturing method according to claim 2, wherein
said ceramic is made of a combination of at least one of silica, mullite and zircon sand.

6. The friction member manufacturing method according to claim 1, wherein
said graphite is about 50 μm to about 200 μm in particle diameter and 1 to 20% in weight ratio, and
said ceramic is about 50 μm to about 200 μm in particle diameter and 1 to 15% in weight ratio.

7. The friction member manufacturing method according to claim 6, wherein
said ceramic is made of a combination of at least one of silica, mullite and zircon sand.

8. The friction member manufacturing method according to claim 1, wherein
said ceramic is made of a combination of at least one of silica, mullite and zircon sand.

9. The friction member manufacturing method according to claim 1 wherein,
said sintering is performed at a temperature of about 780° C. to about 900° C. for about 30 minutes to about 90 minutes.

10. The friction member manufacturing method according to claim 1, wherein said pressure is chosen to suppress segregation of time to 4% or less.

11. The friction member manufacturing method according to claim 10, wherein said pressure is chosen to suppress of tin to substantially zero percent.

* * * * *